(12) United States Patent
Kimura et al.

(10) Patent No.: US 11,562,479 B2
(45) Date of Patent: Jan. 24, 2023

(54) INSPECTION APPARATUS, INSPECTION METHOD, AND NON-VOLATILE STORAGE MEDIUM

(71) Applicant: SEIKO EPSON CORPORATION, Tokyo (JP)

(72) Inventors: Masaki Kimura, Matsumoto (JP); Hiroaki Tsunoda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 218 days.

(21) Appl. No.: 16/804,699

(22) Filed: Feb. 28, 2020

(65) Prior Publication Data

US 2020/0279359 A1 Sep. 3, 2020

(30) Foreign Application Priority Data

Mar. 1, 2019 (JP) .............................. JP2019-037535

(51) Int. Cl.
*G06T 7/00* (2017.01)
*G06T 1/60* (2006.01)
*G06T 1/20* (2006.01)

(52) U.S. Cl.
CPC ............... *G06T 7/001* (2013.01); *G06T 1/20* (2013.01); *G06T 1/60* (2013.01); *G06T 2200/24* (2013.01)

(58) Field of Classification Search
None
See application file for complete search history.

(56) References Cited

U.S. PATENT DOCUMENTS

| 8,103,085 B1* | 1/2012 | Zadeh | G06T 7/001 |
| | | | 382/141 |
| 2018/0322623 A1* | 11/2018 | Memo | G06T 7/0004 |
| 2020/0258230 A1* | 8/2020 | Oi | G06N 20/00 |
| 2021/0027473 A1* | 1/2021 | Oya | G01N 23/2251 |
| 2021/0295485 A1 | 9/2021 | Miyazawa | |

FOREIGN PATENT DOCUMENTS

| JP | 2003-149160 A | 5/2003 |
| JP | 2004-038885 A | 2/2004 |
| JP | 2018-005773 A | 1/2018 |
| WO | 2018/105028 A1 | 6/2018 |

* cited by examiner

*Primary Examiner* — Leon Viet Q Nguyen
(74) *Attorney, Agent, or Firm* — Oliff PLC

(57) ABSTRACT

An inspection apparatus including: a display device; and one or a plurality of processors, wherein the one or the plurality of processors is programmed to execute a method including: converting an inspection target image representing an inspection target into a virtual good article image by using a learning model, the learning model being trained so that an image representing a good article is generated based on features of a plurality of targets that are determined as good articles, generating a difference between the virtual good article image and the inspection target image as a defect candidate image, and displaying the defect candidate image on the display device.

5 Claims, 3 Drawing Sheets

INSPECTION APPARATUS, INSPECTION METHOD, AND NON-VOLATILE STORAGE MEDIUM

The present application is based on, and claims priority from JP Application Serial Number 2019-037535, filed Mar. 1, 2019, the disclosure of which is hereby incorporated by reference herein in its entirety.

BACKGROUND

1. Technical Field

The present disclosure relates to an inspection apparatus, an inspection method, and a program for appearance inspection of an article.

2. Related Art

Appearance inspection refers to inspection for determining a quality of an article by confirming defects such as foreign matters, dirt, scratches, burrs, chips, and deformations attached to a surface of an industrially mass-produced article. In the related art, the appearance inspection is generally performed by the eyes of a person, but in recent years, it has been proposed to realize the appearance inspection by performing an image process on an image which is obtained by imaging an inspection target as an object. For example, JP-A-2003-149160 discloses an appearance inspection apparatus in which an image of an inspection target is binarized to assign a label, a feature value is measured from a region to which the label is assigned is measured to extract a fault candidate, and fault determination is performed based on a predetermined determination standard value.

However, in the appearance inspection apparatus of the related art, in order to determine a defect, it is necessary for a person to determine what kind of feature value is to be measured and to determine a determination standard value for determining a fault. There is a problem that development of such an image process requires advanced knowledge and experience and the development is not easy.

SUMMARY

An inspection apparatus according to an aspect of the present disclosure includes: a display device; and one or a plurality of processors. The one or the plurality of processors is programmed to execute a method including: converting an inspection target image representing an inspection target into a virtual good article image by using a learning model, the learning model being trained so that an image representing a good article is generated based on features of a plurality of targets that are determined as good articles, generating a difference between the virtual good article image and the inspection target image as a defect candidate image, and displaying the defect candidate image on the display device.

A method according to another aspect of the present disclosure includes: converting an inspection target image representing an inspection target into a virtual good article image by using a learning model, the learning model being trained so that an image representing a good article is generated based on features of a plurality of targets that are determined as good articles; generating a difference between the virtual good article image and the inspection target image as a defect candidate image; and displaying the defect candidate image on the display device.

A non-volatile storage medium according to another aspect of the present disclosure stores instructions for causing one or a plurality of processors to execute a method. The method including: converting an inspection target image representing an inspection target into a virtual good article image by using a learning model, the learning model being trained so that an image representing a good article is generated based on features of a plurality of targets that are determined as good articles, generating a difference between the virtual good article image and the inspection target image as a defect candidate image, and displaying the defect candidate image on the display device.

DESCRIPTION OF EXEMPLARY EMBODIMENTS

Hereinafter, embodiments will be described with reference to the drawings. However, in each drawing, a size and a scale of each portion are appropriately changed from actual ones. Further, the embodiments described below are given various technically preferable limitations, but the embodiments are not limited to these forms.

A. Embodiment

Figure 1:
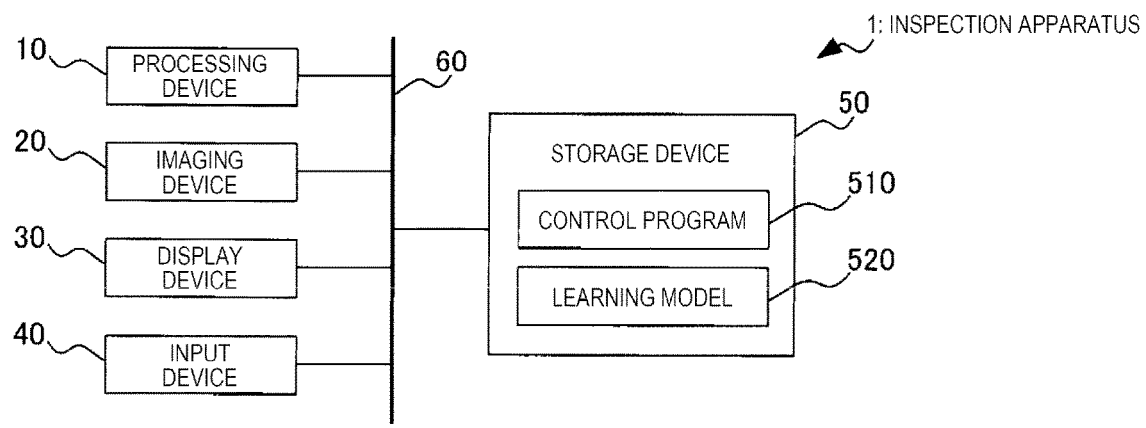
FIG. 1 is a block diagram illustrating an example of a hardware configuration of an inspection apparatus according to an embodiment of the present disclosure.

FIG. 1 is a block diagram illustrating an example of a hardware configuration of an inspection apparatus 1 according to an embodiment of the present disclosure. The inspection apparatus 1 is an apparatus for performing, for example, appearance inspection of an article that is industrially mass-produced. As illustrated in FIG. 1, the inspection apparatus 1 includes a processing device 10, an imaging device 20, a display device 30, an input device 40, a storage device 50, and a bus 60 that mediates data exchange between these components. The inspection apparatus 1 can be applied to an apparatus for inspecting an inside of an article as long as the imaging device 20 can image an inside of the article using X-rays or the like.

The processing device 10 is a processor that controls the entire inspection apparatus 1 and is, for example, a computer constituted by one or a plurality of chips. The processing device 10 is constituted by, for example, a central processing unit (CPU) including an interface with peripheral devices, an arithmetic device, a register, and the like. The processing device 10 functions as a control center of the inspection apparatus 1 by executing a control program 510 stored in the storage device 50. Details of the process executed by the processing device 10 in accordance with the control program 510 will be described later.

The imaging device 20 is, for example, a charge coupled device (CCD) image sensor. The imaging device 20 is provided for capturing an image of an inspection target of the appearance inspection. The imaging device 20 images the inspection target and supplies image data representing the image of the inspection target to the processing device 10 via the bus 60.

The display device 30 is, for example, a liquid crystal display. The display device 30 displays various images under the control of the processing device 10.

The input device 40 includes a pointing device such as a mouse and a keyboard. The input device 40 is provided for causing a user of the inspection apparatus 1 to perform various input operations. When the user performs any input operation such as a key operation on the input device 40, the input device 40 gives operation content data representing the operation content of the user to the processing device 10 via the bus 60. Therefore, the operation content of the user is transmitted to the processing device 10.

Although detailed illustration is omitted in FIG. 1, the storage device 50 includes a volatile storage section and a nonvolatile storage section. The volatile storage section refers to a storage device that cannot hold stored information when power is not supplied. The non-volatile storage section refers to a storage device that can hold stored information even when power is not supplied. An example of the volatile storage section is a random access memory (RAM). The volatile storage section is used by the processing device 10 as a work area when the control program 510 is executed. An example of the nonvolatile storage section is a hard disk. In the nonvolatile storage section, the control program 510 and a learning model 520 are stored in advance.

Figure 2:
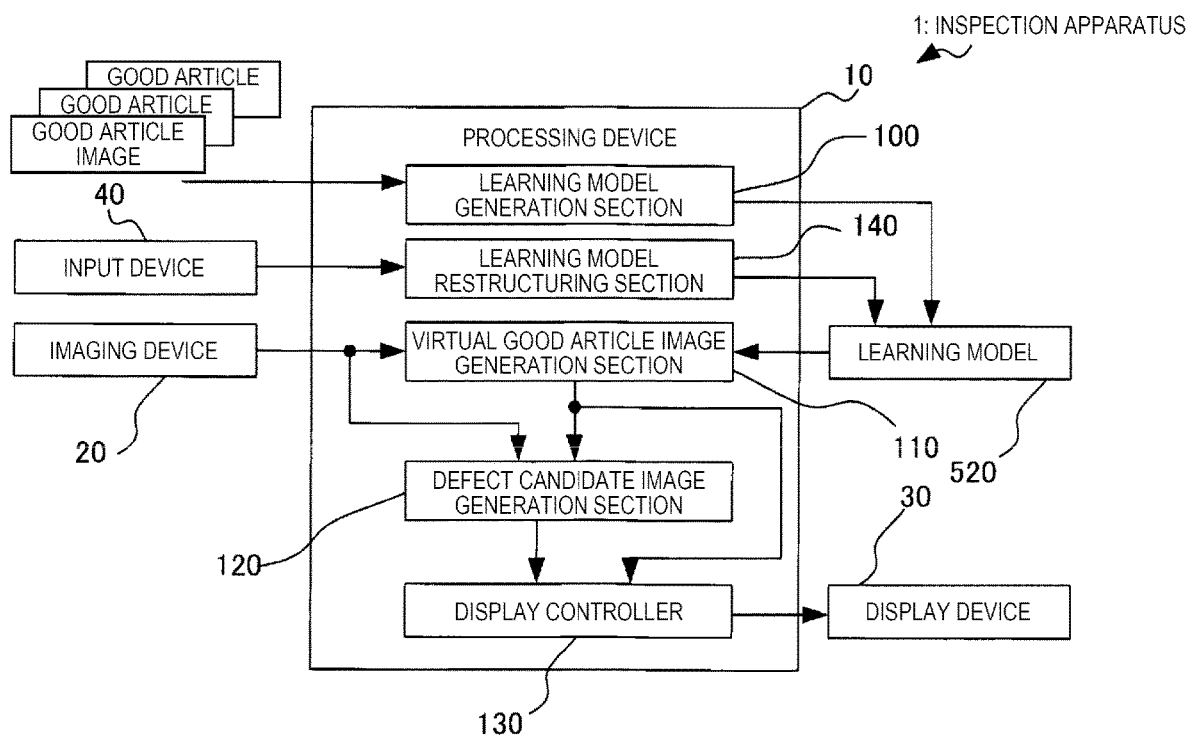
FIG. 2 is a functional block diagram for explaining a function of the inspection apparatus.

For example, the processing device 10 reads the control program 510 from the storage device 50 when the inspection apparatus 1 is turned on (not illustrated), and starts execution of the control program 510. FIG. 2 is a diagram illustrating an example of functional blocks realized by the processing device 10 according to the control program 510. As illustrated in FIG. 2, the processing device 10 operating in accordance with the control program 510 functions as a learning model generation section 100, a virtual good article image generation section 110, a defect candidate image generation section 120, a display controller 130, and a learning model restructuring section 140. A function of each section is as follows.

The learning model generation section 100 generates the learning model 520 that serves as a classifier that determines whether or not the inspection target is a good article based on the image of the inspection target, and stores the learning model 520 in the storage device 50. The learning model 520 is an artificial neural network that has already learned features of a plurality of inspection targets that are determined as the good articles. The learning model generation section 100 generates the learning model 520 by executing machine learning using images of the plurality of inspection targets that are determined as the good articles in the appearance inspection. As an algorithm for generating the learning model 520, an existing machine learning algorithm may be appropriately used. Hereinafter, the image of the inspection target that is determined as the good article in the appearance inspection is referred to as a good article image. Since the inspection target used when the learning model 520 is generated, and the inspection target that is determined whether or not it is the good article using the learning model 520 are different individuals of the same article, hereinafter, the former inspection target is referred to as a first inspection target, and the latter inspection target is referred to as a second inspection target.

Figure 3:
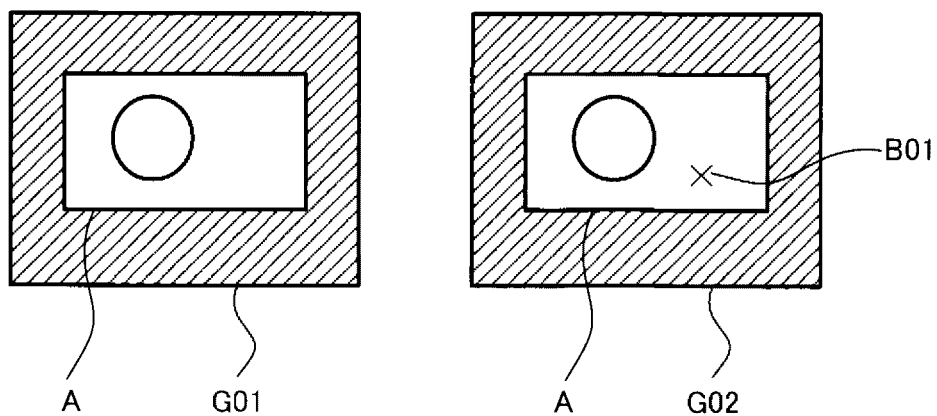
FIG. 3 is a diagram illustrating an example of a good article image used for generation of a learning model.

The plurality of the good article images used when the learning model 520 is generated are images obtained by preparing a plurality of first inspection targets that are determined as the good articles and imaging each of the plurality of first inspection targets. FIG. 3 is a diagram illustrating an example of an image G01 of a first inspection target A of which a plane shape is represented by a combination of a rectangle and a circle, and an image G02 of the first inspection target A that is different from the image G01 of the first inspection target A. In the images G01 and G02, hatching with diagonal lines represents a background. The same applies to images G03 and G04 described later. The image G01 is an image of the first inspection target A that has no defect such as scratches and dirt, and the image G02 is an image of the first inspection target A that has a defect B01 having a size of an allowable range. In the present embodiment, both the image G01 and the image G02 are the good article images. The plurality of good article images used when the learning model 520 is generated include not only the image of the first inspection target having no defect as in the image G01, but also the image of the first inspection target having a defect of an allowable range as the image G02. In the present embodiment, the learning model 520 generated using the plurality of the good article images including the image G01 and the image G02 illustrated in FIG. 3 are stored in the storage device 50 in advance. In the present embodiment, the plurality of the good article images used when the learning model 520 is generated are images obtained by preparing a plurality of first inspection targets that are determined as the good articles and imaging of each of the plurality of first inspection targets, but the present disclosure is not limited thereto. For example, a plurality of images obtained by imaging one first inspection target determined as the good article, from a plurality of directions may be used as the plurality of the good article images.

The learning model 520 is configured to convert the image data into image data representing the good article image and output the image data representing the good article image when the image data representing the image of the second inspection target is input, to output the image data. Hereinafter, the image of the second inspection target is referred to as an inspection target image, and the image data representing the inspection target image is referred to as inspection target image data. Hereinafter, image data that has undergone conversion by the learning model 520 is referred to as virtual good article image data, and an image represented by the virtual good article image data is referred to as a virtual good article image.

The virtual good article image generation section 110 gives the inspection target image data to the learning model 520 and converts the inspection target image data into the virtual good article image data. The virtual good article image data obtained in this way is given to the defect candidate image generation section 120 and the display controller 130.

The defect candidate image generation section 120 generates a difference between the image represented by the virtual good article image data and the image represented by the inspection target image data as a defect candidate image, and outputs the defect candidate image data representing the defect candidate image to the display controller 130. As described above, since the virtual good article image is an image representing the good article, the virtual good article image does not include a defect that causes the article to be determined as a fault article. Therefore, when there is a difference between the virtual good article image and the inspection target image, the difference includes one or a plurality of defect candidates.

The display controller 130 causes the display device 30 to display the defect candidate image or the virtual good article image in accordance with an operation performed on the input device 40.

The user of the inspection apparatus 1 can designate scratches and dirt that should not be regarded as defects originally, that is, an over-detected defect candidate, among one or the plurality of defect candidates displayed on the defect candidate image by an operation on the input device 40. That is, the input device 40 serves as an over-detection designation section that allows the user to designate the over-detected defect candidate from one or the plurality of defect candidates included in the defect candidate image displayed on the display device 30. An example of the operation for designating the over-detected defect candidate is an operation of dragging a periphery of the defect candidate with a mouse or the like so as to surround the defect candidate.

The learning model restructuring section 140 restructures the learning model 520 so that the defect candidate designated by the over-detection designation section is excluded from the conversion target and the virtual good article image is generated. For the restructuring of the learning model 520, an existing machine learning algorithm may be used as in the generation of the learning model 520.

Figure 4:
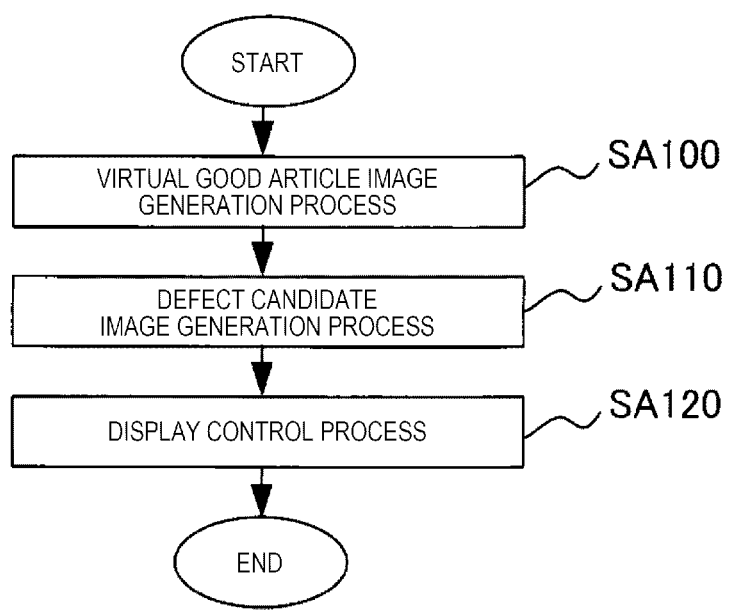
FIG. 4 is a flowchart illustrating a flow of an inspection method executed in the inspection apparatus.

In the inspection apparatus 1 of the present embodiment, the processing device 10 executes an inspection method illustrated in a flowchart of FIG. 4 in accordance with the control program 510. As illustrated in FIG. 4, the inspection method includes a virtual good article image generation process SA100, a defect candidate image generation process SA110, and a display control process SA120.

Figure 5:
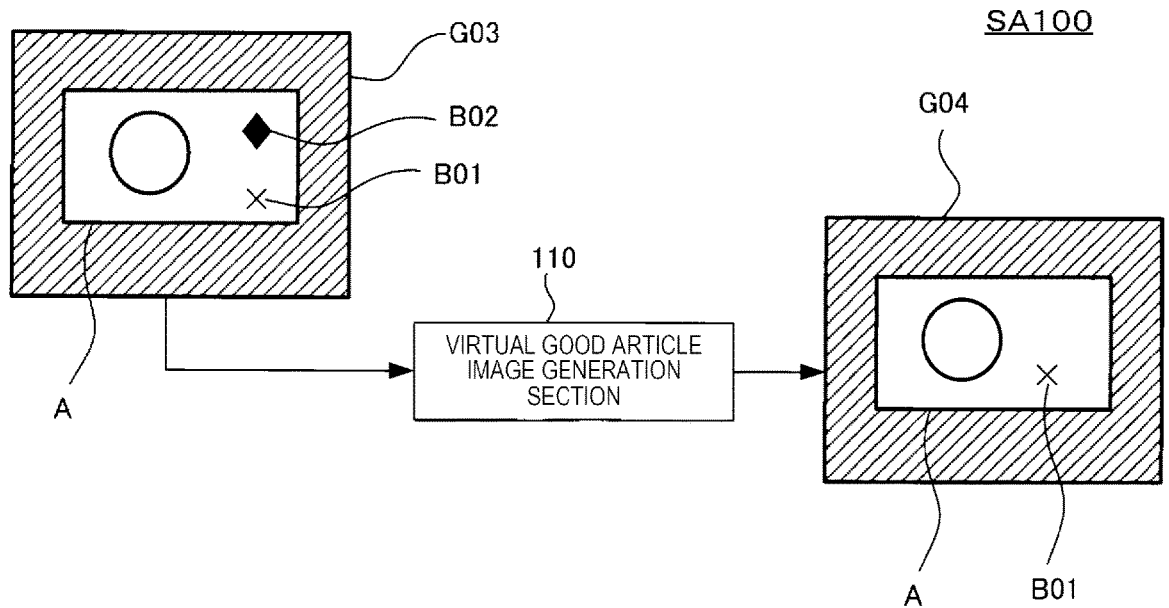
FIG. 5 is a diagram illustrating an example of a processing content of a virtual good article image generation process.

In the virtual good article image generation process SA100, the processing device 10 functions as the virtual good article image generation section 110, gives the inspection target image data to the learning model 520, and converts the inspection target image data into the virtual good article image data. For example, it is assumed that image data representing the image G03 in FIG. 5 is given from the imaging device 20 to the processing device 10 as the inspection target image data. As illustrated in FIG. 5, the second inspection target A having the defects B01 and B02 is reflected on the image G03. The virtual good article image generation section 110 gives the inspection target image data representing the image G03 to the learning model 520, and converts the inspection target image data into virtual good article image data. As described above, when the learning model 520 is generated, the image of the first inspection target A having the defect B01 is used as the good article image. Therefore, the defect B01 is excluded from the conversion target and the learning model 520 removes the data of the defect B02 from the given image data, and converts the image data into virtual good article image data representing the image G04 in FIG. 5.

Figure 6:
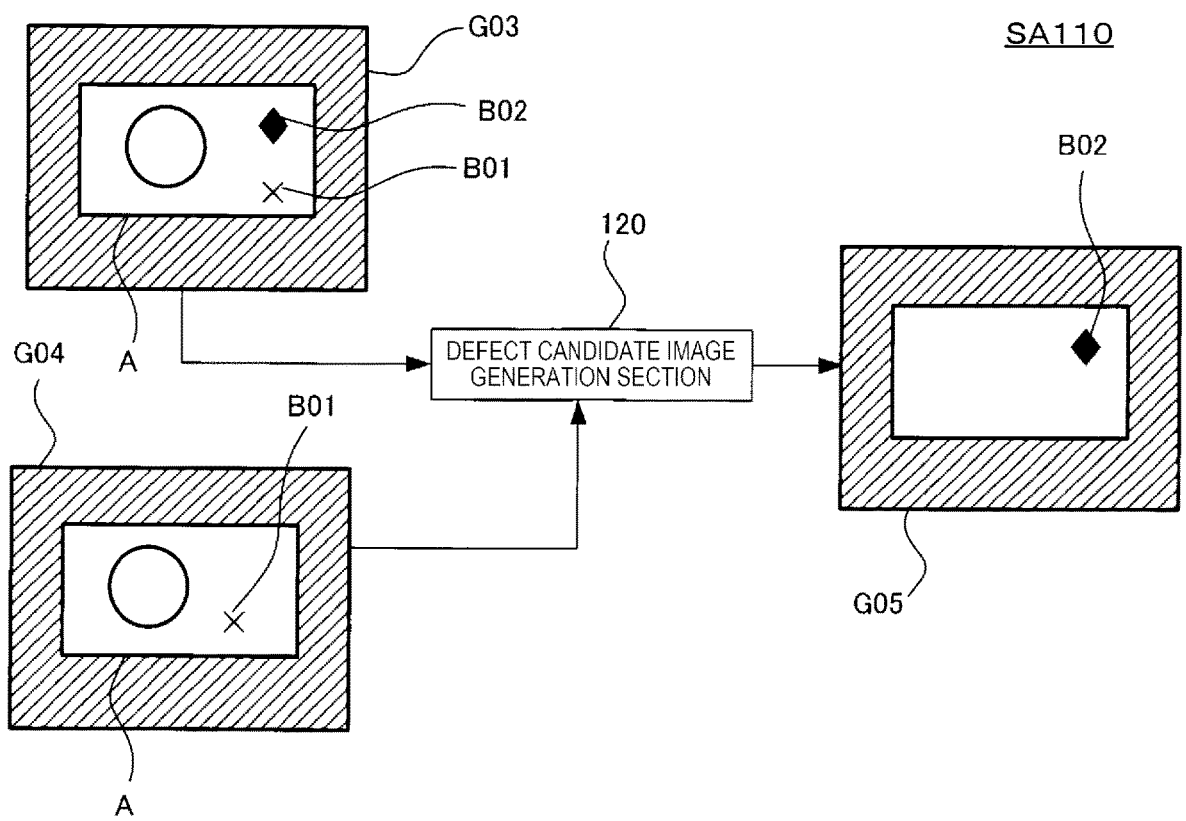
FIG. 6 is a diagram illustrating an example of a processing content of a defect candidate image generation process.

In the defect candidate image generation process SA110, the processing device 10 functions as the defect candidate image generation section 120, generates a difference between the virtual good article image and the inspection target image as the defect candidate image, and outputs the defect candidate image data representing the defect candidate image to the display controller 130. For example, as illustrated in FIG. 6, when inspection target image data representing an image G03 and virtual good article image data representing an image G04 are given, the defect candidate image generation section 120 outputs defect candidate image data representing an image G05 of the defect B02 to the display controller 130.

In the display control process SA120, the processing device 10 functions as the display controller 130 and causes the display device 30 to display the defect candidate image or the virtual good article image in accordance with an operation performed on the input device 40. In the present embodiment, the image G04 or the image G05 is displayed on the display device 30 in accordance with an operation of the user. The user compares the image G03 and the image G04, which are inspection target images, and visually recognizes the image G05. Therefore, it is possible to grasp that learning is performed to determine that a fault article is made by having the defect B02, while the defect B01 does not affect the determination on whether or not it is a good article.

As described above, the user of the inspection apparatus 1 can designate the over-detected defect candidate by an input operation on the defect candidate image. For example, when the user determines that the defect B02 is the over-detected defect candidate, the user designates the defect B02 of the image G05 as the over-detected defect candidate by an operation on the input device 40. When the over-detected defect candidate is designated in this way, the processing device 10 functions as the learning model restructuring section 140 and restructures the learning model 520 so that the virtual good article image from which the defect B02 is excluded is generated. When the restructuring of the learning model 520 is completed, thereafter, the second inspection target A having the defect B02 is determined as the good article.

As described above, the inspection apparatus 1 includes the virtual good article image generation section 110, the defect candidate image generation section 120, and the display controller 130. The virtual good article image generation section 110 gives the inspection target image that is the image of the second inspection target to the learning model 520 that has already learned the features of the plurality of first inspection targets determined as the good articles, and converts the inspection target image into the virtual good article image representing the good article image. The defect candidate image generation section 120 generates the difference between the virtual good article image and the inspection target image as the defect candidate image. The display controller 130 causes the display device 30 to display the defect candidate image. In the inspection apparatus 1, the learning model 520 serving as a classifier that determines whether or not the second inspection target is the good article based on the inspection target image is generated by machine learning using the images of the plurality of first inspection targets that are determined as the good articles. Therefore, in order to determine the defect, it is not necessary for a person to determine what kind of feature value is measured, and it is not necessary for a person to determine a determination standard value for determining a fault. Therefore, advanced knowledge is not required unlike the development of the appearance inspection apparatus of the related art.

In addition, the user of the inspection apparatus 1 can grasp, through the defect candidate image, what kind of defect the second inspection target is not determined as the good article, and the user can clearly grasp the learning contents when the learning model 520 is generated.

Further, the display controller 130 of the inspection apparatus 1 causes the display device 30 to display the virtual good article image. Therefore, the user of the inspection apparatus 1 can also grasp what kind of defect the second inspection target is not determined as the good article by comparing the inspection target image with the virtual good article image.

Further, the inspection apparatus 1 includes the input device 40 that functions as the over-detection designation section that allows the user to designate the over-detected defect candidate from one or the plurality of defect candidates included in the defect candidate image displayed on the display device 30; and the learning model restructuring section 140 that restructures the learning model 520 so that the virtual good article image, from which the defect candidate designated by the over-detection designation section is excluded, is generated. Therefore, according to the inspection apparatus 1, it is possible to cause the user to designate a defect that is over-detected by the learning model 520 and to restructure the learning model 520, and thereby the over-detection does not occur.

The inspection apparatus 1 further includes the learning model generation section 100 that generates the learning model 520 by performing the machine learning using the images of the plurality of first inspection targets that are determined as the good articles in the appearance inspection. In the machine learning of the related art, it is necessary to prepare a sufficient number of the good article samples and samples of the fault articles. On the other hand, in a recent production line, in some cases, an occurrence rate of the defective articles was low, and it was difficult to execute the machine learning without preparing a sufficient number of samples of the fault articles. In contrast, the learning model generation section 100 generates the learning model 520 for determining whether or not the second inspection target is the good article using the images of the plurality of first inspection targets that are determined as the good articles. Therefore, even if there is no sample of the defective article, no particular problem occurs.

B. Other Embodiments

The following modifications may be appropriately combined with the embodiment described above.

(1) The inspection apparatus 1 of the embodiment described above includes the imaging device 20, the display device 30, the input device 40, and the storage device 50 in addition to the processing device 10. However, one, a plurality, or all of the imaging device 20, the display device 30, the input device 40, and the storage device 50 may be coupled to the inspection apparatus 1 via an electric communication line such as a local area network (LAN) or an Internet.

(2) In the embodiment described above, each section of the learning model generation section 100, the virtual good article image generation section 110, the defect candidate image generation section 120, the display controller 130, and the learning model restructuring section 140 is a software module realized by a computer in accordance with the control program 510 that is software. However, Each section of the learning model generation section 100, the virtual good article image generation section 110, the defect candidate image generation section 120, the display controller 130, and the learning model restructuring section 140 is realized by hardware such as an ASIC, and the inspection apparatus 1 may be configured by combining these pieces of hardware.

(3) The learning model generation section 100 may be omitted from the inspection apparatus 1 of the embodiment described above. This is because if the learning model 520 generated by a device separated from the inspection apparatus 1 is stored in the storage device 50, it is possible to generate the virtual good article image and the defect candidate image. Moreover, although the inspection apparatus 1 of the embodiment described above includes the input device 40 serving as the defect designation section and the learning model restructuring section 140, the defect designation section and the learning model restructuring section 140 may be omitted. This is because if the virtual good article image and the defect candidate image can be displayed, the learning contents when the learning model 520 is generated can be clearly grasped by the user, and in order to determine the defect, it is not necessary for a person to determine whether what feature values are measured, and it is not necessary for a person to determine the determination standard value for determining that the article is defective.

Further, the display controller 130 in the embodiment described above causes the display device 30 to display the virtual good article image and the defect candidate image, but the display of the virtual good article image may be omitted and only the display of the defect candidate image may be performed. This is because even if the virtual good article image is not displayed, if the display of the defect candidate image is performed, the user can grasp the learning contents of the machine learning and can also point out the over-detection.

(4) In the embodiment described above, respective processes of the inspection method illustrated in FIG. 4 are performed in the processing device 10. However, respective processes of FIG. 4 may be performed in different devices. In short, there may be provided an inspection method including giving the inspection target image that is the image of the second inspection target to the learning model 520 that has already learned the features of the plurality of first inspection targets that are determined as the good articles; converting the inspection target image into the virtual good article image representing the good article image; generating the difference between the virtual good article image and the inspection target image as the good article image; and allowing the display device 30 to display the defect candidate image. Even in the inspection method, in order to determine the defect, it is not necessary for the person to determine what kind of feature value is measured and it is not necessary for the person to determine the determination standard value for determining the defect.

(5) In the embodiment described above, the control program 510, which causes the processing device 10 to function as the virtual good article image generation section 110, the defect candidate image generation section 120, and the display controller 130, is stored in the storage device 50 in advance. However, a program, which causes a general computer to function as the virtual good article image generation section 110, the defect candidate image generation section 120, and the display controller 130, may be manufactured and distributed as a single unit. This is because the general computer is operated in accordance with the program, so that it is possible to cause the computer to function as the inspection apparatus 1. In addition, as a concrete distribution method of the program described above, a mode, in which the program described above is written and distributed on a computer-readable recording medium such as a flash read only memory (ROM), or a mode, in which the program is distributed by download via a telecommunication line such as the Internet, is conceivable.

What is claimed is:

1. An inspection apparatus comprising:
an input device;
a display device; and
one or a plurality of processors, wherein
the one or the plurality of processors is programmed to execute a method including:
converting an inspection target image representing an inspection target into a virtual good article image by using a learning model, the learning model being trained so that an image representing a good article is generated based on features of a plurality of targets that are determined as good articles, the learning model determining an article to be a good article only when the article does not include a defect that is not designated as an allowable defect,
generating a difference between the virtual good article image and the inspection target image as a defect candidate image,
displaying the defect candidate image on the display device,
receiving, from the input device, designation of an allowable defect from one or a plurality of defect candidates included in the defect candidate image displayed on the display device, the designated allowable defect being one of the one or a plurality of defect candidates in the defect candidate image that is displayed on the display device and being identified as a difference between the virtual good article image and the inspection target image,
restructuring the learning model with the designated allowable defect to update the defect candidate image, and
displaying, on the display device, the updated defect candidate image in which the designated allowable defect is excluded.

2. The inspection apparatus according to claim 1,
the method that the one or the plurality of processors is programmed to execute further including: causing the display device to display the virtual good article image.

3. The inspection apparatus according to claim 1,
the method that the one or the plurality of processors is programmed to execute further including executing machine learning using images of the plurality of targets that are determined as good articles in appearance inspection and generating the learning model.

4. A method comprising:
converting an inspection target image representing an inspection target into a virtual good article image by using a learning model, the learning model being trained so that an image representing a good article is generated based on features of a plurality of targets that are determined as good articles, the learning model determining an article to be a good article only when the article does not include a defect that is not designated as an allowable defect;
generating a difference between the virtual good article image and the inspection target image as a defect candidate image;
displaying the defect candidate image on a display device;
receiving, from an input device, designation of an allowable defect from one or a plurality of defect candidates included in the defect candidate image displayed on the display device, the designated allowable defect being one of the one or a plurality of defect candidates in the defect candidate image that is displayed on the display device and being identified as a difference between the virtual good article image and the inspection target image;
restructuring the learning model with the designated allowable defect to update the defect candidate image; and
displaying, on the display device, the updated defect candidate image in which the designated allowable defect is excluded.

5. A non-volatile storage medium storing instructions for causing one or a plurality of processors to execute a method, wherein
the method including:
converting an inspection target image representing an inspection target into a virtual good article image by using a learning model, the learning model being trained so that an image representing a good article is generated based on features of a plurality of targets that are determined as good articles, the learning model determining an article to be a good article only when the article does not include a defect that is not designated as an allowable defect,
generating a difference between the virtual good article image and the inspection target image as a defect candidate image,
displaying the defect candidate image on a display device,
receiving, from an input device, designation of an allowable defect from one or a plurality of defect candidates included in the defect candidate image displayed on the display device, the designated allowable defect being one of the one or a plurality of defect candidates in the defect candidate image that is displayed on the display device and being identified as a difference between the virtual good article image and the inspection target image,
restructuring the learning model with the designated allowable defect to update the defect candidate image, and
displaying, on the display device, the updated defect candidate image in which the designated allowable defect is excluded.

* * * * *